United States Patent [19]

Nimmo et al.

[11] Patent Number: 4,944,215
[45] Date of Patent: Jul. 31, 1990

[54] FLUID ACTUATED CYLINDER ASSEMBLY WITH A FLOATING CYLINDER HEAD

[76] Inventors: Frank D. Nimmo, 3851 Bennett, Cincinnati, Clermont Cty., Ohio 45245; William H. Newton, 8009 Blairhouse Dr., Cincinnati, Hamilton Cty., Ohio 45244

[21] Appl. No.: 307,019

[22] Filed: Feb. 6, 1989

Related U.S. Application Data

[63] Continuation-in-part of Ser. No. 283,979, Dec. 13, 1988, abandoned.

[51] Int. Cl.$^5$ ............................................. F16J 15/18
[52] U.S. Cl. ..................................... 92/168; 92/170.1; 92/130 R; 92/248; 92/249; 277/27; 277/174; 277/177
[58] Field of Search ...................... 92/165 R, 167, 168, 92/170.1, 177, 248, 130 R, 132, 140, 162 R, 247; 277/27, 174, 177

[56] References Cited

U.S. PATENT DOCUMENTS

| | | | |
|---|---|---|---|
| 2,799,523 | 7/1957 | Parker | 92/168 |
| 2,918,040 | 12/1959 | Lieser | 92/130 R |
| 3,070,070 | 12/1962 | Trevor | 92/168 |
| 3,163,093 | 12/1964 | Gut | 92/166 |
| 3,311,030 | 3/1967 | Halstead | 92/165 R |
| 3,364,454 | 1/1968 | Froebe | 277/174 |
| 3,559,540 | 2/1971 | Sheloon | 92/168 |
| 3,683,754 | 8/1972 | Stuyvenberg | 92/165 R |
| 4,089,253 | 5/1978 | Visser | 92/179 |
| 4,140,044 | 2/1979 | Biller et al. | 91/408 |
| 4,207,807 | 6/1980 | Takata et al. | 92/170.1 |
| 4,211,151 | 7/1980 | Wallischeck | 92/165 R |
| 4,256,019 | 3/1981 | Braddick | 92/165 R |
| 4,262,881 | 4/1981 | Gray | 92/167 |
| 4,289,264 | 9/1981 | Rawlins | 277/27 |
| 4,312,264 | 1/1982 | Nunnemacher et al. | 92/168 |
| 4,360,309 | 11/1982 | Reeves | 92/118 |
| 4,577,870 | 3/1986 | Scott et al. | 277/27 |
| 4,667,780 | 5/1987 | Pauliukonis | 92/170.1 |

FOREIGN PATENT DOCUMENTS

| | | | |
|---|---|---|---|
| 166359 | 7/1950 | Australia | 277/27 |
| 688232 | 6/1964 | Canada | 92/168 |
| 2429917 | 2/1980 | France | 92/168 |
| 58-77971 | 5/1983 | Japan | 277/27 |
| 2022769 | 12/1979 | United Kingdom | 92/168 |
| 2033537 | 5/1980 | United Kingdom | 92/168 |

OTHER PUBLICATIONS

"NFPA Interchangeable Air Cylinders", Suncoast Fluid Power, 13540 Wright Circle, Tampa, Fl., 33626.

(List continued on next page.)

Primary Examiner—Edward K. Look
Assistant Examiner—Thomas Denion
Attorney, Agent, or Firm—Frost & Jacobs

[57] ABSTRACT

A fluid actuated cylinder assembly including a piston and piston rod and having a cylinder head capable of shifting in any direction throughout 360° along a plane perpendicular to the long axis of the cylinder. The piston and piston rod are rockable throughout 360°, the piston maintaining a fluid tight seal with the cylinder at all times. The cylinder, piston rod and shiftable head are preferably made of acetal resin or equivalent thermoplastic material. The piston comprises a sleeve made of acetal resin or equivalent thermoplastic material mounted on the piston rod and having an integral enlarged flange portion with a peripheral surface carrying a seal maintaining a sealing engagement with the cylinder. Alternatively, the piston comprises a spherical rubber member mounted on the piston rod and making the seal with the cylinder. The cylinder assembly can be pneumatically or hydraulically actuated and may be of the single-acting or double-acting type. The cylinder assembly can be fixedly, pivotally or universally mounted. The shiftable head and rockable piston and piston rod preclude reasonable misalignment of the piston rod axis with respect to the axis line of the cylinder from resulting in severe wear of the cylinder head, piston rod and seals causing leakage of air or hydraulic fluid.

35 Claims, 5 Drawing Sheets

OTHER PUBLICATIONS

"Bimba Price/Catalog OL-1086-A", Bimba Manufacturing Co., Monee, Ill. 60440-0068 (Jun. 1988).

"Bimba Flat-1 Stainless Steel Body Air Cylinder, Price/Catalog, FO-1082-C", Bimba Manufacturing Co., Monee, Ill. 60449-0068 (Sep. 1987).

"Bimba Flat-1 Stainless Steel Body Air Cylinder, Price/Catalog FS-487", Bimba Mfg. Co., Monee, Ill., 60449-0068 (Apr. 1987).

"Bimba Flat II Stainless Steel Body Air Cylinder, Price/Catalog FT-1186", Bimba Mfg. Co., Monee, Ill., 60449-0068 (Nov. 1986).

"Automatic Cylinder Catalog", Automatic Valve Products, 41144 Vincenti Ct., Novi, Mi., 48050-0435 (Jan. 1989).

"Pneumatic Automation Components, Catalog No. 87", Air-Mite Devices Inc., 4739 W. Montrose Ave., Chicago, Ill. 60641.

"Heavy Duty Cylinders for Air & Low Pressure Hydraulics, Cat. AA/87", Advance Automation Co., Inc. 3526 Elston Ave., Chicago, Il. 60618.

FLUID ACTUATED CYLINDER ASSEMBLY WITH A FLOATING CYLINDER HEAD

CROSS-REFERENCE TO RELATED APPLICATION

This application is a continuation-in-part application of copending application Ser. No. 07/283,979 now abandoned, filed Dec. 13, 1988, in the names of Frank D. Nimmo and William H. Newton and entitled: A FLUID ACTUATED CYLINDER ASSEMBLY WITH A FLOATING CYLINDER HEAD.

TECHNICAL FIELD

The invention relates to fluid cylinders and more particularly to such cylinders provided with a floating cylinder head to prevent wear and fluid leakage as the result of misalignment of the longitudinal axis of the piston rod with respect to the longitudinal axis of the cylinder.

BACKGROUND ART

The improved cylinder assemblies of the present invention may be either hydraulically or pneumatically actuated. They lend themselves well, for example, to being purged of air when intended to be hydraulically actuated. For purposes of an exemplary showing, the invention will be described in its application to pneumatically actuated cylinders. It is to be understood, however, that this is not a limitation of the present invention and the teachings set forth herein apply equally well to hydraulically actuated cylinders.

The use of pneumatically actuated cylinders in industrial processes and machines is substantially unlimited. The typical cylinder assemblies on the market today are made of aluminum, stainless steel, plated steel or combinations thereof. Pneumatic cylinders of this type require air from which moisture has been removed so as to preclude internal corrosion. They also require continual lubrication which is generally accomplished by adding oil to the pressurized air.

Such conventional pneumatic cylinders are also subject to external corrosion and are generally characterized by relatively heavy weight and relatively high manufacturing, machining and material costs.

It is of utmost importance that the conventional cylinder assembly be so mounted that the longitudinal axis of the piston rod is as nearly as possible coaxial with the longitudinal axis of the cylinder. Such alignment is frequently difficult if not impossible to achieve. Misalignment, however, will cause binding, malfunction, and will destroy the front head seal, resulting in air leakage.

The present invention is based in part on the discovery that many of the above-noted deficiencies of conventional air cylinders can be avoided by making the major cylinder assembly component parts of an appropriate thermoplastic material. It has been found that ultrahigh molecular weight polyethylene will serve the purpose. Acetal resin is, in fact, preferred because of its higher strength, and its ability to withstand higher temperatures of up to about 220° F. An acetal resin suitable for this purpose is manufactured by the E. I. Dupont De Nemours Company, Inc. of Wilmington, Del. under the trademark Delrin ®.

Thermoplastic materials of the type just described are easily machined; will hold tolerances; are resistant to oils, moisture and chemicals; can be used in temperatures of between about 180° F. and about 220° F.; possess high impact strength; resist wear; and are self-lubricating. These materials are also FDA approved for use in the food and drug industries. These plastic materials are about one-third the cost of the materials used in conventional cylinder assemblies and require no plating or other special finishing and polishing. Cylinder assemblies made of the above-identified thermoplastic materials, or their equivalents, demonstrate total corrosion resistance both inside and out. Cylinders made in this manner demonstrate a weight of from about one-half to about one-third the weight of conventional cylinder assemblies. Machining time to make the components is approximately one-sixth that required by conventional cylinder assemblies.

The invention is further based upon the discovery that if the cylinder assembly is provided with a floating head (i.e., a head capable of shifting perpendicular to the longitudinal axis of the cylinder in any direction throughout 360°) wear of the cylinder head, the piston rod and any seals associated therewith, due to the usual misalignment problems encountered, will be greatly reduced or eliminated.

In the manufacture of most cylinder assemblies of the type with which the present application is concerned, tolerances are such that the piston and piston rod are capable of some minute rocking in any direction throughout 360°. It has been found, however, that if the piston is so designed as to greatly increase its rocking capability without diminishing its continuous seal with the cylinder, wear due to misalignment is even further reduced.

It has further been determined that if the piston rod is made of an acetal resin or its equivalent, its natural resiliency will further diminish wear due to misalignment.

In use, a high percentage of conventional cylinder assemblies are destroyed and must be replaced due to misalignment wear. The practice of the present invention greatly reduces or eliminates such wear and therefore significantly lengthens the working life of the cylinder assembly.

DISCLOSURE OF THE INVENTION

According to the invention there is provided an improved fluid cylinder assembly including a cylinder body, a piston, a piston rod and a cylinder head. The cylinder head is mounted within the cylinder body and is so sized as to be shiftable in any direction throughout 360° within a plane perpendicular to the longitudinal axis of the cylinder body. In one embodiment, the cylinder head comprises an annular disk-like member slidably maintained between an internal shoulder of the cylinder body and a split metal ring mounted within the cylinder body near its forward end. In another embodiment the cylinder head comprises an annular disk-like member slidably located between front and rear retainer members, the entire assembly being located between an annular shoulder formed on the inside of the cylinder body and a split metal retaining ring located near the forward end of the cylinder body.

The improved fluid cylinder assembly of the present invention may be a double acting cylinder assembly or a single acting, spring return cylinder assembly. In the double acting embodiment means are provided to form a fluid tight seal between the shiftable cylinder head and the piston rod and to effectively form a fluid tight seal between the shiftable cylinder head and the cylinder body. In the single acting, spring return embodiment, such seals are not required.

In a double acting embodiment of the type wherein the cylinder head comprises an annular disk-like member located between front and rear retainer members, friction between the adjacent surface of the cylinder head and the front retainer during a return stroke of the piston and piston rod can be reduced by providing ball bearings therebetween. Alternatively, this friction can be reduced by the provision of an air cushion or air bearing between the cylinder head and its retainers, as will be described hereinafter.

The piston and piston rod are so designed as to be purposefully rockable throughout 360°. The piston rod extends through and is guided by the central perforation of the annular disk-like cylinder head. One embodiment of piston comprises a sleeve mounted at the rearward end of the piston rod and having an integral enlarged flange portion with a peripheral surface carrying a seal maintaining a sealing engagement with the cylinder regardless of the orientation of the piston and piston rod. Alternatively, the piston comprises a spherical rubber member mounted on the rearward end of the piston rod and making a continuous seal with the cylinder regardless of the orientation of the piston and the piston rod. In yet another embodiment, the piston comprises a spherical member of acetal resin (or equivalent thermoplastic material) provided with a circumferential groove in a plane perpendicular to the axis of the piston rod. A resilient gasket is mounted in the groove and is of such width as to maintain full 360° contact with the inside surface of the cylinder at any angular position of the piston and piston rod therein. The purposeful rocking capability of the piston and piston rod aids further in the minimization or prevention of wear due to misalignment of the long axis of the piston rod with respect to the long axis of the cylinder body.

While they could be made of metallic material, the cylinder body, the piston rod, and the shiftable head assembly are preferably made of acetal resin or the equivalent thermoplastic material. This further adds to the minimization or elimination of wear due to misalignment.

The cylinder assembly can be fixedly, pivotally or universally mounted, according to the nature of the application to which it is directed.

DESCRIPTION OF THE PREFERRED EMBODIMENTS

Figure 1:
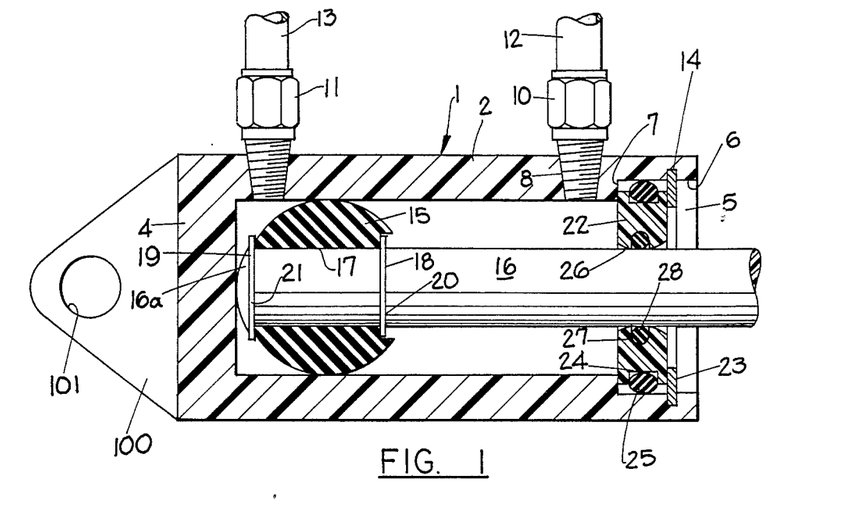
FIG. 1 is a fragmentary, longitudinal cross-sectional view of a first embodiment of the fluid cylinder of the present invention.
Figure 2:
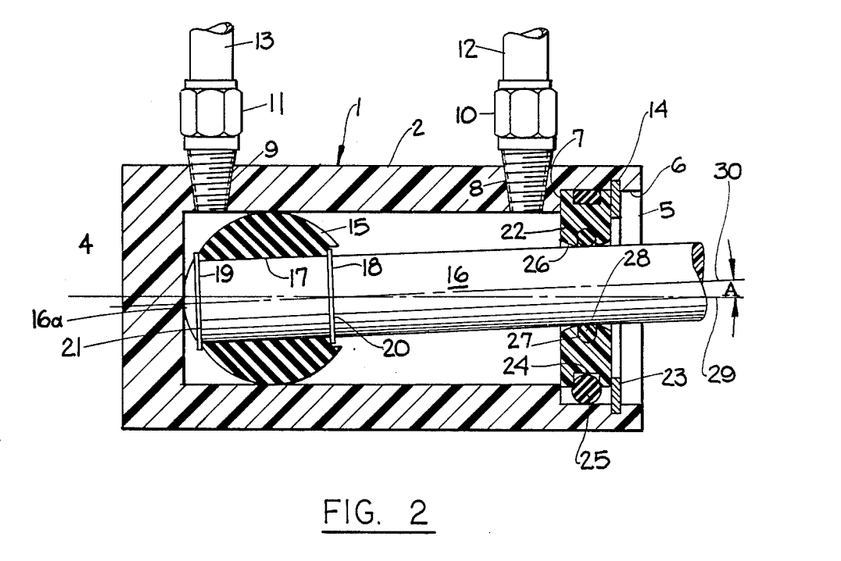
FIG. 2 is a fragmentary, cross-sectional view, similar to FIG. 1, but illustrating the floating head shifted to a maximum misalignment position.

A first embodiment of the present invention is illustrated in FIGS. 1 and 2, wherein like parts have been given like index numerals. The cylinder assembly is generally indicated at 1. The assembly comprises a cylinder body 2. The external cross-sectional shape of the cylinder body 2 does not constitute a limitation of the present invention. Where, as is preferred, the cylinder body is made of an appropriate plastic material such as acetal resin, the cylinder body 2 may conveniently be made of a rod-like block of the material. The cylinder body 2 has a main axial bore 3 of such length as to accommodate the piston stroke for which the cylinder is designed. The rearward end 4 of cylinder body 2 is closed, as shown, and the forward end 5 of cylinder body 2 is open. The cylinder body 2 could be made of an appropriate sized tube of acetal resin or the equivalent with its rearward end closed or plugged by a block of the same material.

At its forward end 5, the cylinder body 2 is provided with a bore 6, the diameter of which is greater than that of main bore 3. At the juncture of bores 3 and 6, an annular shoulder 7 is formed.

Near its forward end 5, the cylinder body 2 is provided with a threaded bore 8. Similarly, a threaded bore 9 is provided in the cylinder body adjacent its rearward end 4. The threaded bores 8 and 9 are adapted to receive conventional line fittings 10 and 11, respectively, whereby air lines 12 and 13 are connected to cylinder main bore 3.

The cylinder body 2 is completed by the provision of an annular notch 14 near its open forward end 5. The purpose of annular notch 14 will be apparent hereinafter.

Cylinder body 2 is provided with a piston 15 and a piston rod 16. The piston 15 is spherical and is made of any appropriate soft, durable rubber such as, for example, 70 durometer Buna-N rubber. The piston rod 16 is preferably flexible and made of acetal resin or its equivalent. The piston rod 16 passes through a perforation 17 in piston 15. The piston 15 is maintained in place near the rearward end 16a of piston rod 16 by a pair of split metal retaining rings 18 and 19 located in annular grooves 20 and 21, respectively, formed in the peripheral surface of piston rod 16. It will be noted that the rearward end 16a of piston rod 16 is rounded and that the forward retaining ring 18 is inset with respect to spherical piston 15. The reasons for this construction will be apparent hereinafter.

The piston assembly 1 is completed by the provision of floating head 22. The floating head 22 comprises a disk-like annular member, preferably made of acetal resin or the equivalent. It will be noted from FIGS. 1 and 2 that the floating head has an external diameter slightly greater than the diameter of main bore 3, and less than the diameter of bore 6.

Floating head 22 is slidably and captively mounted within bore 6 between annular shoulder 7 and a split metal retaining ring 23 engaged in annular notch 14 of cylinder body 2. The floating head is capable of shifting in a plane perpendicular to the long axis of cylinder body 2 in any direction 360° about that plane. The peripheral edge surface of the floating head 22 has an annular notch 24 formed therein, adapted to receive a soft, resilient O-ring 25, so sized as to maintain a seal between the periphery of floating head 22 and the inside surface of bore 6, regardless of the position of floating head 22.

Floating head 22 has an axial bore 26 formed therein. The edges of bore 26 are preferably rounded, as shown to accommodate for misalignment of piston rod 16. The bore 26 is provided with an annular notch 27 containing an O-ring 28 which constantly forms a seal with the peripheral surface of piston rod 16. Thus, it will be evident that at all times there will be a seal between floating head 22 and the inside surface of bore 6 by virtue of O-ring 25 and a seal between floating head 22 and piston rod 16 by virtue of O-ring 28.

In FIG. 2, the piston rod 16 is illustrated at its maximum misalignment angle in one direction (i.e., upwardly as viewed in the figure). In FIG. 2, the center line of cylinder body 2 is shown at 29, while the center line of the piston rod 16 is shown at 30. The angle A therebetween represents the maximum misalignment angle in one direction. Since head 22 is universally moveable, the piston rod 16 is capable of a total misalignment angle in two opposite directions of 2a.

The misalignment angle just described is not only made possible by floating head 22, but also by the nature of piston 15. It will be apparent from FIGS. 1 and 2 that, since piston 15 is spherical, it is capable of rocking in any direction 360° about its centerpoint, while still maintaining a line or narrow band seal with the inside surface of cylinder bore 3.

In an exemplary embodiment, a cylinder of the type illustrated in FIGS. 1 and 2 was built, and was designed to have a stroke of about two inches. In the exemplary cylinder, the misalignment angle A is approximately 5°. Thus, with the cylinder body 2 rigidly mounted, a misalignment angle in one direction of about 5° and in opposite directions of about 10° could be tolerated without wear or damage to the cylinder assembly 1, or air leakage.

The operation of cylinder assembly 1 is, of course, conventional. Airlines 12 and 13 will be connected alternately to a source of air under pressure and exhaust by an appropriate valve means (not shown). Thus, when line 13 is connected to air under pressure and line 12 to exhaust, the piston 15 and piston rod 16 will advance through a workstroke. When line 12 is connected to air under pressure and line 13 to exhaust, the piston 15 and piston rod 16 will shift through a return stroke.

The end of the return stroke is determined by the abutment of the rearward end 16a of piston rod 16 against the closed rearward end 4 of cylinder body 2. The rearward end 16a of piston rod 16 is rounded to provide a point contact with the cylinder body rearward end 4. If the rearward end 16a of the piston rod 16 were flat, the tendency at the end of the return stroke would be to cause the entire flat end of piston rod to abut the cylinder body end 4. This would introduce an unwanted bending movement for the piston rod. The same thing would be true if the end of the work stroke was determined by abutment of the floating head by the retaining ring 18. For this reason the retaining ring is inset as illustrated in FIGS. 1 and 2.

Figure 3:
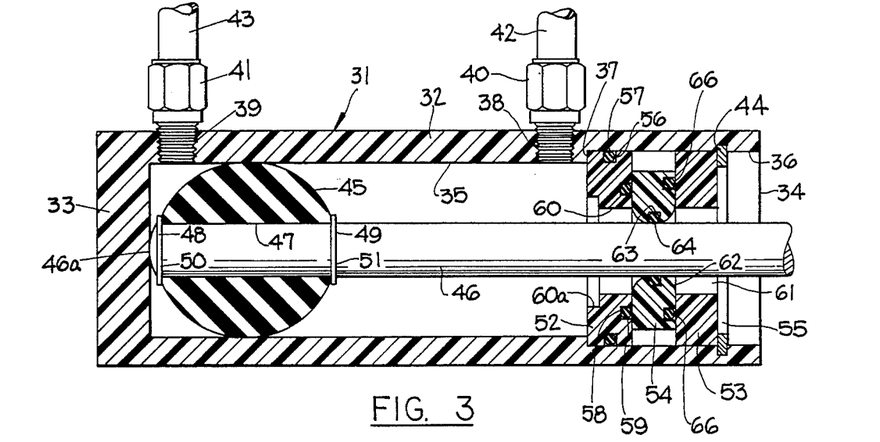
FIG. 3 is a fragmentary, longitudinal cross-sectional view of another embodiment of the fluid cylinder of the present invention.
Figure 4:
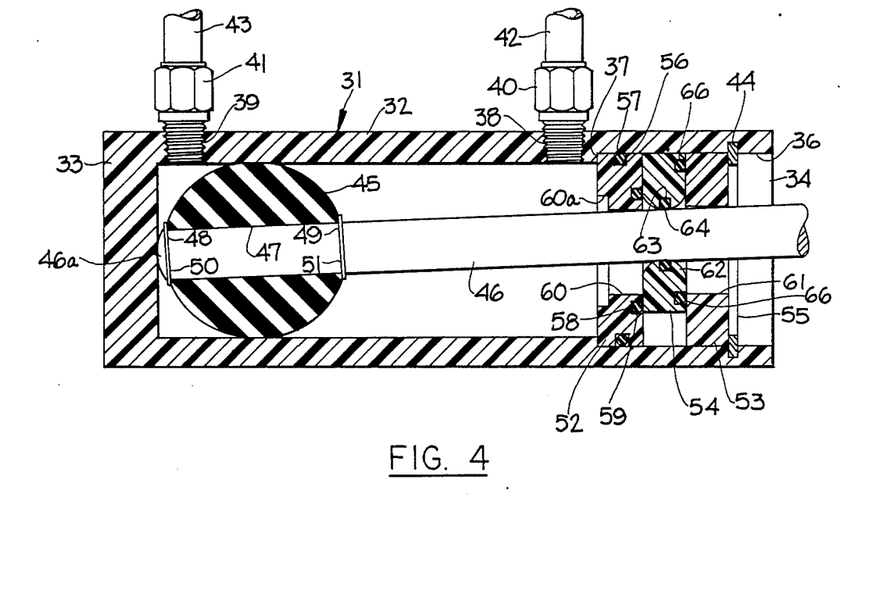
FIG. 4 is a fragmentary, cross-sectional view similar to FIG. 3, but illustrating the floating head in a maximum misalignment position.

A second embodiment of the cylinder assembly of the present invention is illustrated at 31 in FIGS. 3 and 4. The cylinder body 32 of cylinder assembly 31, like the cylinder body 2 of cylinder assembly 1, has a closed rearward end 33, an open forward end 34, a main bore 35 and a second bore 36 near its forward end. The second bore 36 is of larger diameter than the main bore 35, forming an annular shoulder 37 at their juncture. Cylinder body 32 is also provided with a pair of threaded bores 38 and 39, equivalent to the threaded bores 8 and 9 of the embodiment of FIGS. 1 and 2. Threaded bores 38 and 39 are adapted to accommodate conventional fittings 40 and 41 by means of which air lines 42 and 43 are connected to the main cylinder bore 35. Finally, the cylinder body 32 is completed by the provision of an annular groove 44 near its forward end. The groove 44 is similar to groove 14 in the embodiment of FIGS. 1 and 2.

The cylinder assembly 31 is provided with a piston 45 and piston rod 46 substantially identical to that described with respect to FIGS. 1 and 2. The piston 45 is spherical and preferably made of resilient rubber. The piston rod 46 is preferably flexible and made of acetal resin. The piston rod 46 passes through a perforation 47 in piston 45 which is locked in place by split metal rings 48 and 49 located in grooves 50 and 51 in piston rod 46. The only difference between the piston 45 and piston rod 46 of FIGS. 3 and 4 and the like parts of FIGS. 1 and 2 is the fact that retaining 49 is not inset within piston 45.

The structure thus far described with respect to FIGS. 3 and 4 is substantially identical to that described with respect to FIGS. 1 and 2. The embodiment of FIGS. 3 and 4 differs from that of FIGS. 1 and 2 primarily in the structure of the floating head assembly, next to be described.

The floating head assembly comprises an annular disk-like rear retainer member 52, an annular disk-like front retainer member 53 and an annular disk-like floating head 54 located therebetween. This assembly is held in place at the forward end of cylinder body 32 by abutment of rear retainer member 52 against annular shoulder 37 and abutment of the front retainer member 53 against a split metal ring 55 mounted in annular notch 44. The floating head 54 is shiftable between rear and front retainer members 52 and 53 in any direction along a plane perpendicular to the long axis of cylinder body 32. The rear retainer member has a peripheral annular notch 56 containing an O-ring 57 sealingly engaging the inside surface of bore 36. The forward face of rear retainer member 52 has an annular notch 58 containing an O-ring 59 which sealingly engages the rear face of floating head 54, regardless of its position. The rear retainer member 52 and the front retainer member 53 are provided with central perforations 60 and 61, respectively, through which piston rod 46 extends. The perforations 60 and 61 are so sized as to accommodate the maximum misalignment angle of piston rod 46, throughout 360°.

Floating head 54 is provided with a central perforation similar to the central perforation 26 of floating head 22 and preferably with its edges rounded in the same manner. The perforation 62 is provided with an annular notch 63 containing an O-ring 64 forming a sealing engagement between the floating head 54 and piston rod 46. It will be understood that O-rings 57, 59 and 64 will preclude leakage of air through the open forward end 34 of cylinder body 32.

Figure 5:
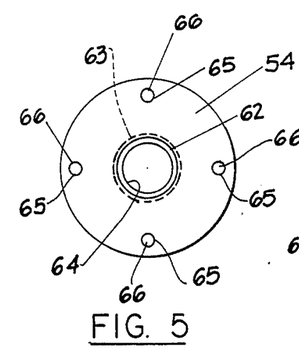
FIG. 5 is an elevational view of the floating head of FIGS. 3 and 4, as seen from the right of those figures.

The front face of floating head 54 is illustrated in FIG. 5. It will be noted from FIG. 5 that the front face of floating head 54 is provided with four evenly spaced depressions 65 adapted to receive ball bearings 66. As will apparent from FIG. 4, the ball bearings 66 contact and roll along the rear surface of front retainer member 53 reducing friction between floating head 54 and front retainer member 53 so that floating head 54 can shift smoothly and easily, particularly during the return stroke.

It will be understood by one skilled in the art that the operation of the embodiment of FIGS. 3 and 4 is substantially identical to that described with respect to the embodiment of FIGS. 1 and 2. The floating head 54 allows a misalignment angle in all directions throughout 360° about a plane perpendicular to the center line of the cylinder. Any misalignment within this allowance will not harm the cylinder assembly or create wear thereof, resulting in permanent damage and air leakage.

In the embodiment of FIGS. 3 and 4 the rearward end 46a of piston rod 46 is rounded for the same reason given with respect to the rounded end 16a of piston rod 16 of FIGS. 1 and 2. However, it will be noted that the forward retaining ring 49 for piston 45 is not inset as is ring 18 of FIGS. 1 and 2. This is true because an annular notch has been provided in rear retainer member 52 to accommodate ring 49 and prevent it from creating a bending movement when the piston 45 and piston rod 46 reach the end of the work stroke.

Figure 6:
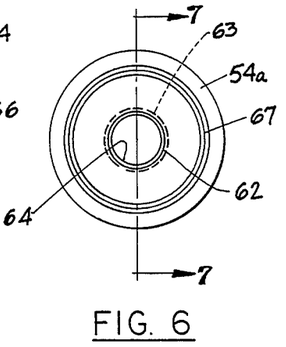
FIG. 6 is an elevational view, similar to FIG. 5, and illustrating an alternative form of floating head for the embodiment of FIGS. 3 and 4.
Figure 7:
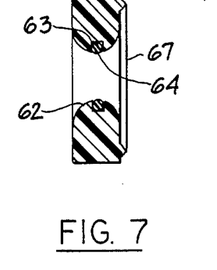
FIG. 7 is a cross-sectional view taken along section line 7—7 of FIG. 6.

FIGS. 6 and 7 illustrate a floating head 54a which may be substituted for floating head 54 in the embodiment of FIGS. 3 and 4. Like parts have been given like index numerals. The floating head 54a differs from floating head 54 in that the depressions 65 and ball bearings 66 have been replaced by a continuous annular rib 67. The rib 67 has a substantially triangular cross section so that its contact with the rearward surface of front retainer member 53 is essentially a line contact. The rib 67 is intended to serve the same purpose as ball bearings 66.

Figure 8:
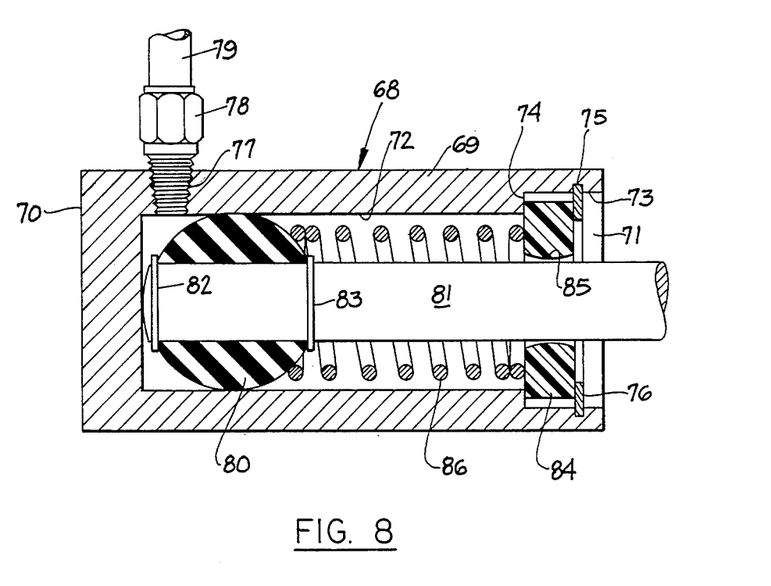
FIG. 8 is a fragmentary, cross-sectional view of a single acting, spring return embodiment of the fluid cylinder of the present invention.

FIG. 8 illustrates the application of the teachings of the present invention to a single acting, spring back type cylinder assembly. In FIG. 8, the cylinder assembly is generally indicated at 68. The cylinder assembly 68 comprises a cylinder body 69 having a closed rearward end 70 and an open forward end 71. The cylinder body 69 has a main bore 72 and a second bore 73 near its forward end 71. The bore 73 is of larger diameter than the bore 72, forming an annular shoulder 74 therebetween. The cylinder body 69 has an annular notch 75 near its forward end 71 for receipt of a split metal retaining ring 76, the purpose of which will be apparent hereinafter.

From the description thus far, it will be apparent that the cylinder body 69 is similar to cylinder body 2 of FIGS. 1 and 2 and cylinder body 32 of FIGS. 3 and 4. A primary difference lies in the fact that the cylinder body 69 is provided with only one threaded bore 77 near its rearward end 70. The bore 77 is adapted to receive a conventional fitting 78 for connection of airline 79 to main cylinder bore 72.

The cylinder assembly 68 also includes a piston 80 and a piston rod 81. The piston 80 and piston rod 81 are substantially identical to the piston 15 and piston rod 16 of FIG. 1 and are held in assembly by retaining rings 82 and 83. In this instance, there is no need to inset the ring 83.

It will be noted that the cylinder assembly 68 is provided with a disk-like floating head 84 quite similar to the floating head 22 of the embodiment of FIGS. 1 and 2. To this end, floating head 84 has an outside diameter greater than main bore 72 and less than bore 73 and is shiftably and captively maintained between shoulder 74 and split metal ring 76. Again, the floating head 84 can shift in any direction 360° about a plane perpendicular to the long axis of cylinder body 69.

In this embodiment, however, it is not necessary that there be an airtight seal between the floating head 84 and the cylinder body 69, or the floating head 84 and the piston rod 81. The only airtight seal required in this embodiment is that formed between piston 80 and the inside surface of main bore 72.

Floating head 84 has a central bore 85. The central bore 85 may be a cylindrical bore of such diameter as to accommodate the piston rod 81 at its maximum misalignment angle in any direction. The bore can be made slightly smaller if its end edges are curved as shown.

The cylinder assembly is completed by the provision of a compression spring 86. The compression spring 86 is located about piston rod 81. One end of compression spring 86 abuts piston 80. The other end of compression spring 86 abuts floating head 84.

The operation of the embodiment of FIG. 8 may now be described. The piston and piston rod will normally occupy the position shown, being biased to that position by compression spring 86. The air line 79 will be connected to a valve (not shown) capable of alternately connecting air line 79 to a source of air under pressure and to exhaust. When air line 79 is connected to the source of air under pressure, the piston 80 and piston rod 81 will advance through a workstroke. When the air line 79 is connected to exhaust, the piston 80 and piston rod 81 will be shifted through a return stroke by compression spring 86. The piston assembly can tolerate the same sort of misalignment as described with respect to the embodiment of FIGS. 1 and 2 and the embodiment of FIGS. 3 and 4, by virtue of floating head 84 and piston 80 which can rock in any direction throughout 360° about its center point and still maintain a line or narrow band seal with the inside surface of main bore 72. As in the case of the previously described embodiments, it is preferred that the cylinder body 69, piston rod 81 and floating head 84 be made of acetal resin or the equivalent and that the piston 80 be made of soft rubber.

In the embodiment of FIG. 8, the floating head serves a number of purposes. First of all, it acts as a guide for the piston rod 81. Secondly, it serves as a seat or anchor for one end of compression spring 86. Finally, it will minimize the amount of dirt and foreign material entering the cylinder assembly from its open forward end. If dirt and fines constitute a particular problem in a particular application of the cylinder assembly 68, the floating head may be provided with an O-ring similar to O-ring 28 of FIGS. 1 and 2.

Figures 9, 10, 11, 12:
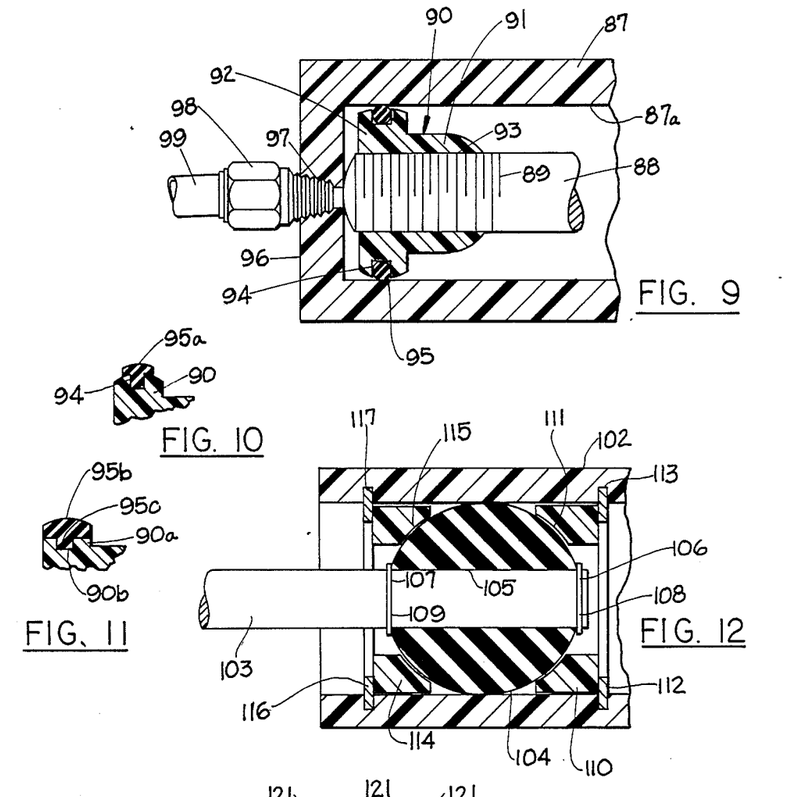
FIG. 9 is a fragmentary, longitudinal cross-sectional view of a piston which can be used in any of the embodiments of FIGS. 1–8.
FIGS. 10 and 11 are fragmentary cross-sectional views of the piston of FIG. 9, illustrating alternative forms of seals therefor.
FIG. 12 is a fragmentary, longitudinal cross-sectional view, illustrating a universal mount which can be used with any of the embodiments of FIGS. 1–11.

FIG. 9 illustrates another form of piston which can be utilized in any of the previously described embodiments. In FIG. 9, the cylinder body 87 is shown which can be equivalent to cylinder body 2 of FIGS. 1 and 2, cylinder body 32 of FIGS. 3 and 4, or cylinder body 69 of FIG. 8. A piston rod is fragmentarily shown at 88 and can be considered equivalent to piston rod 16 of FIG. 1, piston rod 46 of FIG. 3, or piston rod 81 of FIG. 70. The rearmost end of piston rod 88 is threaded as at 89.

The piston is generally indicated at 90 and comprises a cylindrical sleeve portion 91 provided with an enlarged annular flange 92 at its rearward end. The piston 90 has an axial bore extending therethrough which is internally threaded as at 93. The piston 90 is affixed to the rearward end of piston rod 88 by the threaded engagement of piston rod threads 89 and piston threads 93. It will be noted that the forward edge of the sleeve portion 91 is rounded. When the piston 90 and piston rod 88 reach the end of their work stroke and the forward end of piston sleeve portion 90 abuts floating head 22 (FIG. 1) or the rear retainer member 52 (FIG. 3), the forward end of sleeve portion 90 will not create a bending movement.

The peripheral edge of the enlarged flange 92 is slightly rounded as shown. Centrally of this peripheral edge there is formed an annular notch 94 containing an O-ring seal 95. By virtue of the arcuate peripheral surface of flange 92 and the O-ring seal 95, it will be apparent that the piston 90 can rock in any direction 360° about the flange portion and maintain a line or narrow band seal with the inside surface of the bore of cylinder body 87, similar to the seal maintained by the spherical piston 15 of FIG. 1.

In the embodiment of FIG. 9, it is preferred that the cylinder body 87, piston rod 88 and piston 90 be made of acetal resin or the equivalent. The closed end 96 of cylinder body 87 is provided with a threaded bore 97 adapted to receive a conventional fitting 98 for connection of an airline 99 to the bore of cylinder 87. The fitting 98 is equivalent to the fittings 11, 41 and 78 of FIGS. 1, 3 and 8, respectively.

FIG. 10 is a fragmentary cross-sectional view of the flange portion of the cylinder of FIG. 9 with an alternative form of O-ring 95a thereon. In this instance, the O-ring 95a is of T-shaped cross section. This configuration permits greater rocking of piston 90 while maintaining a continuous seal with the inside surface of the main bore 87a of cylinder body 87.

FIG. 11 is again a fragmentary cross-sectional view of the flange portion of the cylinder of FIG. 9. In this instance the flange portion 90a is somewhat shorter and is provided with a thicker annular seal 95b having a stem 95c received within an annular groove 90b of flange portion 90a. The seal 95b can be additionally affixed to flange portion 90a by adhesive means or the like.

Depending upon the particular application made of the cylinders of the present invention, they may be provided with a rigid mounting, a pivotal mounting or a universal mounting. A rigid mounting may be accomplished by appropriate straps, brackets, clamps, flanges or the like, as is well known in the art. A typical, but non-limiting, pivotal attaching means is illustrated in FIG. 1. To this end, the closed rearward end 4 of the cylinder body 2 is provided with a rearwardly extending flange 100. The flange 100 may be attached to the rearward cylinder body end 4 by any appropriate means, or it may constitute an integral, one-piece part thereof. The flange 100 is provided with a transverse perforation 101 adapted to receive an appropriate pivot pin, or the like.

FIG. 12 illustrates an exemplary, but non-limiting, universal mounting for a cylinder of the present invention. FIG. 10 illustrates the open rearward end of an exemplary cylinder body 102.

The universal mounting means comprises a mounting rod 103 provided with a spherical rubber head 104 substantially identical to the piston 15 of FIG. 1. The mounting rod 103 extends through a bore 105 in the spherical seal. The spherical seal is fixed on the mounting stem 103 by a pair of split metal rings 106 and 107 located in annular grooves 108 and 109 in the mounting rod.

Directly in front of the spherical head 104 there is located an annular forward retaining rim 110. Retaining rim 110 has an arcuate relief 111 located adjacent spherical head 104. The forward retaining rim 110 abuts a split metal ring 112 located in an annular notch 113 in the cylinder body 102. Immediately behind the spherical head 104 there is an annular rearward retaining rim 114 having an arcuate relief 115 adjacent the head 104. The rearward retaining rim 114 is identical the forward retaining rim 110 and is held in place by a split metal ring 116 mounted in an annular groove 117 in the cylinder body 102.

It will be apparent from the foregoing that the mounting rod 103 and spherical head 104 not only form a universal mounting for cylinder body 102, but also effectively close and seal the rearward end of the cylinder body 102. The spherical head 104 makes a continuous line or narrow band seal with the inside surface of cylinder body 102 regardless of the orientation of the mounting rod 103 and spherical head 104. It will be understood that the piston and piston rod of the cylinder will be located to the right of split metal ring 112.

The free end of mounting rod 103 may be attached to the means mounting the cylinder in any appropriate way. For example, the free end of the mounting rod can be threaded and threadedly engaged with the mounting means. Alternatively, the free end of the mounting rod may be enlarged and provided with a transverse perforation adapted to receive an appropriate pivot pin, or the like. Again, it is preferred that the mounting rod 103 and the forward and rearward retaining rims 110 and 114 be made of acetal resin or the equivalent.

Figure 13:
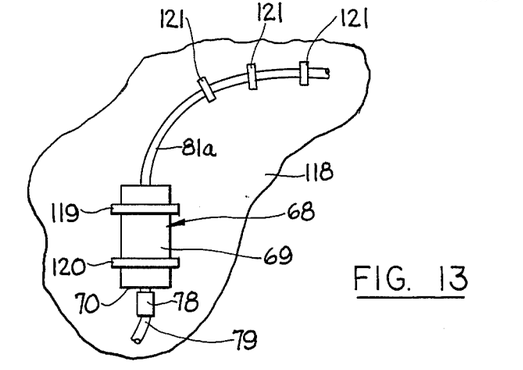
FIG. 13 is an elevational view of the embodiment of FIG. 8 with the piston rod so oriented and guided that its working end is shiftable in directions substantially perpendicular to the cylinder axis.

From the above description it will be apparent that the teachings of the present invention provide air actuated or hydraulically actuated cylinders which are relatively simple and inexpensive to manufacture, lightweight, compact, and characterized by a long service life. Reasonable misalignment of the piston rod axis with respect to the long axis of the cylinder will not create destructive wear of the piston rod and the head seals, requiring frequent repair or replacement of the cylinders. This is made possible by the provision of the 360° floating head of the present invention and is enhanced by the 360° rocking piston. Added to this, there is the flexible characteristic of the piston rod when made of acetal resin or the equivalent. In fact, it has been found that by properly designing the diameter and length of a piston rod of the present invention, the work stroke of the free end of the piston rod may be along a line oriented at 90° or more to the long axis of the cylinder body. This is illustrated in FIG. 13. While FIG. 13 could illustrate any of the embodiments of the present invention, for purposes of an exemplary showing the single acting cylinder of FIG. 8 is shown. The cylinder assembly 68 is rigidly mounted to a surface 118 by appropriate bracket means 119 and 120. The cylinder assembly 68 is provided with an elongated piston rod 81a of acetal resin or the equivalent piston rod 81a passes through a series of guide brackets or eyelets 121. It will be apparent that the work and return strokes of the free end of piston rod 81a will extend in directions substantially perpendicular to the long axis of cylinder body 69. The flexibility of the piston rod 81a, together with the floating head and rocking piston (not shown in FIG. 13) will prevent undue wear of the seals and will provide the cylinder assembly 68 with an excellent working life.

The spherical piston of FIGS. 1, 3, and 8 as well as the spherical head of FIG. 12 could be made of acetal resin or the equivalent and could further be provided with an appropriate annular seal to form a fluid-tight seal with the cylinder bore.

If the head 104 of FIG. 12 is made of acetal resin or the equivalent, the surface 115 of rearward retaining rim could be provided with ball bearings or an annular rib, equivalent to rib 67 of FIGS. 6 and 7 to reduce friction between surface 115 and head 104, particularly during a work stroke of the cylinder assembly.

As used herein and in the claims, the term "O-ring" is used to describe an annular resilient seal, regardless of its cross-sectional configuration.

Figure 14:
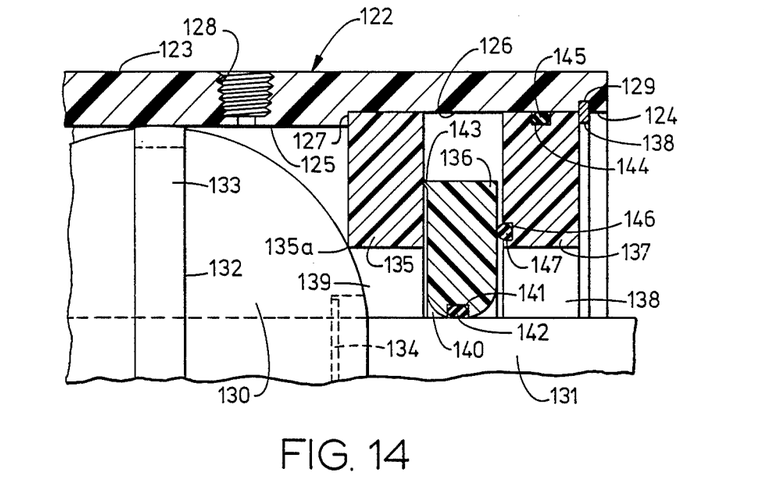
FIG. 14 is a fragmentary longitudinal cross sectional view of another embodiment of the parent invention illustrating the piston and piston rod in their fully extended positions.
Figure 15:
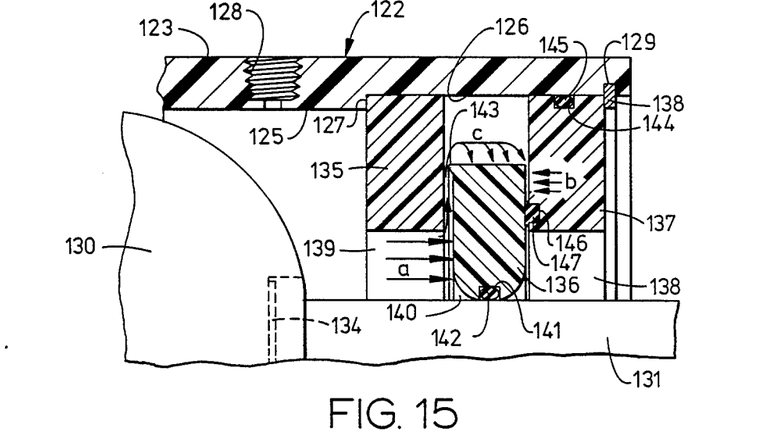
FIG. 15 is a fragmentary, longitudinal cross sectional view of the embodiment of FIG. 14, illustrating the piston and piston rod during their return stroke.

Reference is now made to the embodiment of FIGS. 14 and 15. It will be noted that the embodiment of FIGS. 13 and 14 constitutes a double acting cylinder similar in most respects to the embodiment of FIGS. 3 and 4. The cylinder body 123 of the cylinder assembly generally indicated at 122 has a closed rearward end (not shown) and an open forward end (124). The cylinder body 123 has a main bore 125 and a second bore 126 of larger diameter, forming an annual shoulder 127 at their juncture. As in the embodiment of FIGS. 3 and 4, the cylinder body 123 is provided with a pair of threaded bores, one of which is illustrated at 128. These threaded bores are equivalent to threaded bores 38 and 39 of FIG. 3 and are adapted to accommodate conventional fittings (not shown) by means of which air lines (not shown) are connected to main cylinder bore 125. The cylinder body 123 is completed by the provision of an annular groove 129, equivalent to the annular groove 44 of FIG. 3.

The cylinder assembly 122 is provided with a piston 130 and a piston rod 131. The piston 130 could be identical to piston 15 of FIG. 1, piston 45 of FIG. 3, or piston 91 of FIG. 9. For purposes of an exemplary showing, however, piston 130 is illustrated as comprising a sphere of acetal resin or the equivalent thermoplastic material piston 130 is provided with an annular groove 132 located diametrically with respect to piston 130 and perpendicular to the long axis of piston rod 131. The groove 132 contains an O-ring 133 of resilient material such as silicone rubber, Buna-N rubber or the like. The O-ring 133 is of such width that it will remain in continuous 360° contact with main bore 125, at any angular position achievable by the piston 130 and piston rod 131.

The piston rod 131 passes through a bore in piston 130 and the piston 130 is affixed to the piston rod 131 by a pair of split metal retaining rings, one of which is shown at 134. The split metal ring 134, and the one not shown, can be equivalent to split metal rings 18 and 19 of FIG. 1, or split metal rings 48 and 49 of FIG. 3. The piston rod 131 is preferably flexible and made of acetal resin or the equivalent.

The floating head assembly of the embodiment of FIGS. 14 and 15 comprises an annular disk-like rear retainer member 135, an annular disk-like front retainer member 137 and an annular disk-like floating head 136 located therebetween. This assembly is held in place at the foreward end of cylinder body 123 by abutment of the rear retainer member 135 against annular shoulder 127, and abutment of the front retainer member 137 against a split metal ring mounted in annular notch 129. It will be noted that the floating head assembly thus far described is quite similar to that described with respect to FIGS. 3 and 4. The floating head 136 is shiftable between the rear and front retainer members 135 and 137 in any direction along a plane perpendicular to the long axis of cylinder body 123.

Unlike the rear retainer member 52 of FIG. 3, the rear retainer member 135 of FIG. 14 is not provided with annular notches equivalent to notches 56 and 58 and is not provided with O-rings equivalent to O-rings 57 and 59 of FIG. 3. The rear retainer member 135 of FIG. 14 could be provided with an annular notch equivalent to notch 60a (see FIG. 4) if the split metal ring 134 of piston rod 131 were not inset with respect to piston 130. Rear retainer member 135 is provided with a central perforation 139 through which piston rod 131 extends, and is so sized as to accommodate the maximum misalignment angle of piston rod 131, throughout 360°.

The floating head 136 is provided with a central perforation 140 with its edges rounded. The perforation 140 is provided with an annular notch 141 containing an O-ring 142 forming a sealing engagement between the floating head 136 and the piston rod 131.

The rear surface of floating head 136 which faces the forward surface of rear retainer member 135 may be planar throughout, preferably, however, it is provided with an annular rib 143, similar to the rib 67 shown in FIGS. 6 and 7. The rib 143 is substantially triangular in cross section so that the contact between the rear face of floating head 136 and the forward face of the rear retainer member 135 is essentially a line contact.

The front retainer member 137 is provided with a peripheral groove 144 containing an O-ring 145. O-ring 145 makes a seal between cylinder bore 126 and the peripheral edge of the front retainer member 137.

The front retainer member 137 is also provided with an annular groove 146 on its rearward face, containing an O-ring 147. The O-ring 147 is so positioned as to make a continuous seal with the front surface of floating head 136, regardless of the position of the floating head. From the above description, it will be apparent that O-rings 142, 147 and 145 effectively prevent escape of air or fluid from the forward end of cylinder assembly 122. The front retainer member 137 is provided with a central bore 148 through which piston rod 131 extends, and is so sized as to accommodate the maximum misalignment angle of piston rod 131, throughout 360°.

FIG. 14 shows the parts of interest in their respective positions at the completion of a work stroke. It will be noted that floating head 136 is narrower than the space between the forward face of rear retainer member 135 and the rearward face of front retainer member 137. Throughout the work stroke the space between piston 130 and the floating head assembly is pressurized by the advancing piston 130 and is connected to exhaust via port 128. The annular rib (if present), or the rearward surface of the floating head, will be maintained out of contact with, or at a reduced frictional contact with, the forward face of the rear retainer member by the air pressure. Under these circumstances, the floating head 136 can be shifted in any direction throughout 360° relatively easily during a work stroke.

At the end of a work stroke, if the piston rod 131 is maintained in its extended position, air pressure between the piston 130 and the floating head will slowly decay to ambient air pressure. This is true because the air will slowly leak past the point of contact 135a between the rear retainer member 135 and piston 130 toward port 128. The annular rib 143 (or the rearward surface of floating head 136 in the absence of rib 143) will abut the forward surface of rear retainer member and pressurized air trapped between this abutment and O-ring 147 will slowly leak through this abutment.

FIG. 15 illustrates the structure of FIG. 14 just after a return stroke has been initiated. In this instance, air under pressure is introduced through port 128 to that space between piston 130 and the floating head assembly. The pressurized air acts to shift the floating head forwardly, as is indicated by arrows a. This action is resisted by the front retainer member 137, as is indicated by arrows b. The slight shifting of the floating head 137 to the right, as viewed in FIG. 15, permits air under pressure to pass between the floating head 136 and rear retainer member 135. The pressurized air fills the chamber defined by the bore 126, the rear retainer member 135, the floating head 136 and the front retainer member 137. Pressurized air also passes between the floating head 136 and the front retainer member 137, up to O-ring 147. This passage of air under pressure between the floating head 136, the rear retainer member 135 and the front retainer member 137 is indicated by arrows c. In this way an air cushion or air bearing is formed between the floating head and the retainer members causing floating head 136 to be easily movable in any direction about 360° during a return stroke. When the work and return strokes of the piston follow each other in rapid succession, it has been found that some of the air cushion or air bearing remains even during completion of the work and return strokes.

Modifications may be made in the invention without departing from the spirit of it.

What is claimed is:

1. A fluid actuated cylinder comprising a cylinder body, a piston, a piston rod and a cylinder head, said cylinder body having an axial bore with an open forward end and a closed rearward end, said piston rod having a rearward end, said piston being mounted on said piston rod at said rearward end thereof, said piston and piston rod being slidably mounted within said cylinder bore, means on said piston making a continuous seal with said cylinder bore, said piston rod extending through a central bore in said cylinder head and being slidable with respect thereto, means mounting said cylinder head near said cylinder body forward end, said cylinder head being so sized and said mounting means therefor being such that said cylinder head is shiftable in at least two opposite directions within a plane perpendicular to the longitudinal axis of said cylinder body, whereby wear of the cylinder assembly parts due to misalignment of the longitudinal axis of said piston rod with respect to the longitudinal axis of said cylinder body is greatly reduced.

2. The cylinder assembly claimed in claim 1 wherein said cylinder head is shiftable in any direction throughout 360° within said plane perpendicular to the longitudinal axis of said cylinder body.

3. The cylinder assembly claimed in claim 2 wherein said cylinder assembly is double acting having a fluid connection near said forward and rearward ends of said cylinder bore, said piston and piston rod being shiftable through a work stroke by fluid under pressure introduced through said fluid connection near said rearward end of said cylinder bore and through a return stroke by fluid under pressure introduced through said fluid connection near said forward end of said cylinder bore, said cylinder bore forward of said forward fluid connection having a portion of enlarged diameter, an annular shoulder being defined at the juncture of said cylinder bore and its enlarged diameter portion, said cylinder head and its mounting means being located within said bore portion of enlarged diameter, said fluid being chosen from the class consisting of air and hydraulic fluid.

4. The cylinder assembly claimed in claim 2, wherein said cylinder bore at its forward end has a portion of enlarged diameter, an annular shoulder being defined at the juncture of said cylinder bore and its enlarged diameter portion, said cylinder head and its mounting means being located in said enlarged diameter bore portion, said cylinder assembly being single acting having a fluid connection near said rearward end of said bore, said piston and piston rod being shiftable through a work stroke by fluid under pressure introduced through said fluid connection, a compression spring surrounding said piston rod, one end of said compression spring abutting said piston, the other end of said compression spring abutting said cylinder head, said piston and piston rod being shiftable through a return stroke by said compression spring.

5. The cylinder assembly claimed in claim 2 wherein said cylinder body, cylinder head, and piston rod are made of self-lubricating thermoplastic resin.

6. The cylinder assembly claimed in claim 2 wherein said cylinder body, cylinder head, and piston rod are made of acetal resin.

7. The cylinder assembly claimed in claim 3 wherein said cylinder head comprises an annular disk-like member having an outside diameter greater than said cylinder bore diameter and less than the diameter of said enlarged bore portion, said cylinder head being slidably mounted in said enlarged bore portion between said shoulder and a retaining member affixed therein, said cylinder head having an annular notch formed in its peripheral edge, a soft, resilient O-ring being mounted in said peripheral notch and being so sized as to make a continuous fluid-tight seal between said cylinder head and said enlarged diameter bore portion regardless of the position of said cylinder head, said central perforation of said cylinder head being surrounded by an annular notch, a sealing means mounted in said last mentioned notch forming a continuous fluid-tight seal between said cylinder head and said piston rod.

8. The cylinder assembly claimed in claim 3 wherein said cylinder head comprises an annular disk-like member having an outside diameter greater than said cylinder bore diameter and less than the diameter of said enlarged bore portion, an annular disk-like rear retainer member having an outside diameter approximating that of said enlarged diameter bore portion and an annular disk-like front retainer member having an outside diameter approximating that of said enlarged diameter bore portion, said rear retainer member and said front retainer member being mounted within said enlarged bore portion with said cylinder head slidably mounted therebetween, said rear retainer member abutting said annular shoulder said front retainer member abutting a retaining ring mounted in said enlarged bore portion, said rear retainer member having an annular notch formed in its peripheral edge, an O-ring being mounted in said annular notch and forming a continuous fluid-tight seal between said enlarged diameter bore portion and said rear retainer member, said rear retainer member having an annular notch formed in that side thereof facing said cylinder head, an O-ring mounted in said last mentioned notch forming a fluid-tight seal between said rear retainer member and the adjacent side of said cylinder head regardless of the position of said cylinder head, said central perforation of said cylinder head being surrounded by an annular notch, a sealing means mounted in said last mentioned notch forming a continuous fluid-tight seal between said cylinder head and said piston rod.

9. The cylinder assembly claimed in claim 3 wherein said cylinder head comprises an annular disk-like member having an outside diameter greater than said cylinder bore diameter and less than the diameter of said enlarged bore portion, an annular disk-like rear retainer member having an outside diameter approximating that of said enlarged diameter bore portion and an annular disk-like front retainer member having an outside diameter approximating that of said enlarged diameter bore portion, said rear retainer member and said front retainer member being mounted within said enlarged bore portion with said cylinder head slidably mounted therebetween, said rear retainer member abutting said annular shoulder, said front retainer member abutting a retaining ring mounted in said enlarged bore portion, said front retainer member having an annular notch formed in its peripheral edge, an O-ring being mounted in said annular notch and forming a continuous fluid-tight seal between said enlarged diameter bore portion and said front retainer member, said front retainer member having an annular notch formed in that side thereof facing said cylinder head, an O-ring mounted in said last mentioned notch forming a fluid-tight seal between said front retainer member and the adjacent side of said cylinder head regardless of the position of said cylinder head, said central perforation of said cylinder head being surrounded by an annular notch, a sealing means mounted in said last mentioned notch forming a continuous fluid-tight seal between said cylinder head and said piston rod, said cylinder head being of a width slightly less than the distance between said front and rear retainer members, whereby air under pressure during work and return strokes is present between adjacent surfaces of said front retainer member, said cylinder head, and said rear retainer member to form an air bearing therebetween.

10. The cylinder assembly claimed in claim 4 wherein said cylinder head comprises an annular disk-like member having an outside diameter greater than said cylinder bore diameter and less than the diameter of said enlarged bore portion, said cylinder head being slidably mounted in said enlarged bore portion between said shoulder and a retaining member affixed therein.

11. The cylinder assembly claimed in claim 7 wherein said cylinder body, cylinder head and piston rod are made of acetal resin.

12. The cylinder assembly claimed in claim 7 wherein said piston comprises a sleeve mounted on the piston rod with an enlarged flange portion having a peripheral surface supporting an annular seal making a continuous fluid-tight seal with said cylinder bore, said piston and piston rod being rockable throughout 360° while maintaining said last mentioned seal.

13. The cylinder assembly claimed in claim 7 wherein said piston comprises a spherical member mounted on said piston rod, said piston and piston rod being rockable in any direction throughout 360°, said spherical piston making a fluid-tight seal with said cylinder bore regardless of the orientation of said piston and piston rod.

14. The cylinder assembly claimed in claim 7 wherein said piston comprises a spherical member mounted on said piston rod, said piston having a circumferential groove extending thereabout, said groove being perpendicular to the long axis of said piston rod, an O-ring mounted in said groove, said piston and piston rod being rockable in any direction throughout 360°, said O-ring making a fluid-tight seal with said cylinder bore regardless of the orientation of said piston and piston rod.

15. The cylinder assembly claimed in claim 8 wherein said cylinder body, cylinder head, piston rod, rear retainer member and said front retainer member are made of acetal resin.

16. The cylinder assembly claimed in claim 8 wherein said piston comprises a sleeve mounted on the piston rod with an enlarged flange portion having a peripheral surface supporting an annular seal making a continuous fluid-tight seal with said cylinder bore, said piston and piston rod being rockable throughout 360° while maintaining said last mentioned seal.

17. The cylinder assembly claimed in claim 8 wherein said piston comprises a spherical member mounted on said piston rod, said piston and piston rod being rockable in any direction throughout 360°, said spherical piston making a fluid-tight seal with said cylinder bore regardless of the orientation of said piston and piston rod.

18. The cylinder assembly claimed in claim 8 wherein said piston comprises a spherical member mounted on said piston rod, said piston having a circumferential groove extending thereabout, said groove being perpendicular to the long axis of said piston rod, an O-ring mounted in said groove, said piston and piston rod being rockable in any direction throughout 360°, said O-ring making a fluid-tight seal with said cylinder bore regardless of the orientation of said piston and piston rod.

19. The cylinder assembly claimed in claim 8 including a plurality of depressions in that side of said cylinder head adjacent said front retainer member and ball bearings located in said depressions and contacting said adjacent front retainer member to reduce friction between said cylinder head and said front retainer member.

20. The cylinder assembly claimed in claim 8 including a thin annular rib on that side of said cylinder head adjacent said front retainer member, said rib contacting said adjacent front retainer member reducing friction between said cylinder head and said front retainer member.

21. The cylinder assembly claimed in claim 9 wherein said cylinder body, cylinder head, piston rod, rear retainer member and said front retainer member are made of acetal resin.

22. The cylinder assembly claimed in claim 9 wherein said piston comprises a sleeve mounted on the piston rod with an enlarged flange portion having a peripheral surface supporting an annular seal making a continuous fluid-tight seal with said cylinder bore, said piston and piston rod being rockable throughout 360° while maintaining said last mentioned seal.

23. The cylinder assembly claimed in claim 9 wherein said piston comprises a spherical member mounted on said piston rod, said piston and piston rod being rockable in any direction throughout 360°, said spherical piston making a fluid-tight seal with said cylinder bore regardless of the orientation of said piston and piston rod.

24. The cylinder assembly claimed in claim 9 wherein said piston comprises a spherical member mounted on said piston rod, said piston having a circumferential groove extending thereabout, said groove being perpendicular to the long axis of said piston rod, an O-ring mounted in said groove, said piston and piston rod being rockable in any direction throughout 360°, said O-ring making a fluid-tight seal with said cylinder bore regardless of the orientation of said piston and piston rod.

25. The cylinder assembly claimed in claim 8 including a thin annular rib on that side of said cylinder head adjacent said rear retainer member, said rib contacting said adjacent rear retainer member reducing friction between said cylinder head and said rear retainer member.

26. The cylinder assembly claimed in claim 2 including a universal mounting for attaching said cylinder to a support, said cylinder body having an open rear end, said mounting comprising a spherical member and a mounting stem passing through a diametric hole in said spherical member, means to affix said spherical member at one end of said mounting stem, said spherical member being of such diameter as to make a 360° contact with said cylinder body said mounting stem and spherical member being rockable within said cylinder bore throughout 360° about the long axis of said cylinder body, at least that part of said spherical member capable of contacting said cylinder body being made of rubber and forming a fluid-tight seal with said cylinder body, retaining means within said cylinder bore in front of and behind said spherical member to prevent shifting thereof axially of said cylinder bore, and said mounting stem having a free end provided with means for attachment to said support.

27. The cylinder assembly claimed in claim 12 wherein said piston is made of thermoplastic material.

28. The cylinder assembly claimed in claim 13 wherein said spherical piston is made of rubber.

29. The cylinder assembly claimed in claim 14 wherein said spherical member is made of thermoplastic material.

30. The cylinder assembly claimed in claim 16 wherein said piston is made of thermoplastic material.

31. The cylinder assembly claimed in claim 17 wherein said spherical piston is made of rubber.

32. The cylinder assembly claimed in claim 18 wherein said spherical member is made of thermoplastic material.

33. The cylinder assembly claimed in claim 22 wherein said piston is made of thermoplastic material.

34. The cylinder assembly claimed in claim 23 wherein said spherical piston is made of rubber.

35. The cylinder assembly claimed in claim 24 wherein said spherical member is made of thermoplastic material.

* * * * *

UNITED STATES PATENT AND TRADEMARK OFFICE
CERTIFICATE OF CORRECTION

PATENT NO. : 4,944,215

DATED : July 31, 1990

INVENTOR(S) : Frank D. Nimmo & William H. Newton

It is certified that error appears in the above-identified patent and that said Letters Patent is hereby corrected as shown below:

Claim 7, column 14, line 53:  Change "O-ring" to
            --sealing means--.

Claim 8, column 15, line 7:  After "shoulder"
            insert --,--.

Signed and Sealed this

Seventeenth Day of December, 1991

Attest:

HARRY F. MANBECK, JR.

*Attesting Officer*     *Commissioner of Patents and Trademarks*